United States Patent [19]

Parisi

[11] Patent Number: 5,304,361
[45] Date of Patent: Apr. 19, 1994

[54] REMOVAL OF HYDROGEN SULFIDE

[75] Inventor: Paul J. Parisi, Saint Lambert, Canada

[73] Assignee: Union Carbide Chemicals & Plastics Technology Corporation, Danbury, Conn.

[21] Appl. No.: 905,037

[22] Filed: Jun. 26, 1992

[51] Int. Cl.$^5$ ............................................. C01B 17/16
[52] U.S. Cl. ................................. 423/220; 423/222; 423/243.01; 423/244.01; 423/574.1; 423/575
[58] Field of Search ............... 423/220, 222, 243.01, 423/244.01, 574 R, 574.1, 574.2, 575

[56] References Cited

U.S. PATENT DOCUMENTS

| | | | |
|---|---|---|---|
| 3,637,352 | 1/1972 | Bratzler et al. | 23/225 P |
| 4,085,199 | 4/1978 | Singleton et al. | 423/574 R |
| 4,113,849 | 9/1978 | Atwood | 423/574 R |
| 4,363,791 | 12/1982 | Trentham et al. | 423/243 |
| 4,442,083 | 4/1984 | Canales et al. | 423/567 R |
| 4,450,145 | 5/1984 | Klepeis | 423/242 |
| 4,988,494 | 1/1991 | Lagas et al. | 423/574 R |
| 5,019,361 | 5/1991 | Hakka | 423/243 |

OTHER PUBLICATIONS

"Look at Claus Unit Design" by D. Parnell Hydrocarbon Processing, Sep. 1985 pp. 114–118.
"Sulphur, Sulphur Dioxide and Sulphuric Acid" by U. H. F. Sander et al. 1984, The British Sulphur Coporation Ltd. pp. 42–90.
"High Recovery, lower emissions" by David K. Beavon et al. The Oil and Gas Journal, Mar. 12, 1979 pp. 76–80.
C. M. Yon, et al., "Integrated UCAP-A New Approach to Sulfur Recovery", 1979 NPRA Annual Meeting, Mar. 25–27, 1979.

*Primary Examiner*—Gary P. Straub
*Assistant Examiner*—Timothy C. Vanoy
*Attorney, Agent, or Firm*—W. K. Volles

[57] ABSTRACT

Improved processes are disclosed for the removal of hydrogen sulfide from feed streams by conversion of hydrogen sulfide and sulfur dioxide to elemental sulfur and water, e.g. Claus process. The feed stream of the present invention is divided into two split streams wherein one is incinerated to form sulfur dioxide in the presence of oxygen. The sulfur dioxide is then separated from the water, nitrogen and other impurities and combined with the other split stream to form a reactor feed which is passed to a sulfur reaction zone for conversion to elemental sulfur. Due to the rejection of water, nitrogen and other impurities from the reactor inlet stream, a higher concentration of hydrogen sulfide and sulfur dioxide can be achieved in the sulfur reaction zone. As a result, the processes of the present invention can be used to increase the throughput of existing Claus process plants and reduce the size of new Claus process plants.

10 Claims, 1 Drawing Sheet

REMOVAL OF HYDROGEN SULFIDE

FIELD OF THE INVENTION

The present invention relates to the removal of hydrogen sulfide from feed streams and, more specifically, to improved processes for the removal of hydrogen sulfide from feed streams wherein the hydrogen sulfide is converted to elemental sulfur.

BACKGROUND OF THE INVENTION

Hydrogen sulfide is commonly present in the effluent streams from various processes in chemical plants, refineries and natural gas plants. Typically, the concentration of hydrogen sulfide in such streams ranges from about 20 to about 90 mole percent and occasionally up to 100 mole percent. Other components typically present in such streams include, for example, carbon dioxide, carbon monoxide, carbonyl sulfide, carbon disulfide, water, light hydrocarbons, ammonia, hydrogen cyanide and nitrogen.

It is often necessary to reduce the concentration of hydrogen sulfide in the above effluent streams to meet current environmental regulations which limit the amount of sulfur compounds, such as hydrogen sulfide and sulfur dioxide, which can be emitted to the atmosphere. Typical acceptable levels range from about 10 to 100 ppm of hydrogen sulfide and from about 50 to 1000 ppm of sulfur dioxide.

A common method for reducing the concentration of hydrogen sulfide in process streams is to react hydrogen sulfide with sulfur dioxide to form elemental sulfur and water. This method is generally known in the industry as the Claus process. In the Claus process, hydrogen sulfide is reacted with oxygen, e.g. air, by carefully controlled combustion to form a combustion product having a molar ratio of about two-thirds hydrogen sulfide to one-third sulfur dioxide. During the combustion, some elemental sulfur is formed, which is removed from the combustion product by cooling. Unreacted hydrogen sulfide and sulfur dioxide are passed to one or more catalytic reactors which typically comprise a cobalt-molybdenum catalyst on an alumina support for further conversion to elemental sulfur. A detailed description of the Claus process is provided, for example, by Sander, et al., "Sulfur, Sulfur Dioxide and Sulfuric Acid" The British Sulfur Corporation Ltd. (1984).

One problem associated with the Claus process is that the combustion forms water as a by-product. In addition, when air is used for combustion, the combustion product will comprise nitrogen. Thus, water and nitrogen then comprise a portion of the reactor feed along with feed impurities, e.g. carbon dioxide. These components are inerts in the reaction of hydrogen sulfide and sulfur dioxide to form elemental sulfur and water, and have the effect of reducing the concentration and hence, partial pressure of the hydrogen sulfide and sulfur dioxide in the reactor feed. In fact, when air is used for combustion, 6 moles of nitrogen are introduced in the product per mole of sulfur dioxide formed. Thus, the dilution effect of the nitrogen is significant. As a result, the driving force for the reaction and the reaction rate are lower than a reactor feed without such inerts. Performing the combustion in the presence of pure oxygen or air enriched in oxygen, or increasing the total pressure during the reaction step, can increase the partial pressure of the reactants. However, the costs of providing pure oxygen or air enriched in oxygen can be prohibitively expensive. Furthermore, since the feed streams commonly treated by the Claus process are at essentially ambient pressure, increasing the total pressure requires compression of the feed stream which is often uneconomical. Another problem related to combustion is that the combustion step must be carefully controlled in order to achieve the appropriate concentrations of hydrogen sulfide and sulfur dioxide in the reactor feed.

The Claus process typically operates at reaction efficiencies, i.e. conversion to elemental sulfur, of about 95 to 98 percent. Accordingly, since the conversion is incomplete, the tail-gas often must be treated prior to being emitted to the atmosphere. One method of treating the tail-gas is by simple incineration of the hydrogen sulfide to form sulfur dioxide. However, this method is often unacceptable because the resulting sulfur dioxide concentration usually exceeds the acceptable environmental limits. Another method for reducing the concentration in the tail-gas is to hydrogenate the sulfur dioxide to hydrogen sulfide, recover the hydrogen sulfide, such as by absorption, and recycle the hydrogen sulfide to the feed-end of the Claus process. Another method is to incinerate the hydrogen sulfide in the presence of oxygen to form sulfur dioxide, recover the sulfur dioxide, such as by absorption, and recycle the sulfur dioxide to the feed-end of the Claus process. These options are known in the art and described, for example, by Sander, et al., supra, at pages 56 to 90.

Although the Claus process has been widely used commercially for the removal of hydrogen sulfide from feed streams, improved processes are desired which can reduce the concentrations of water and nitrogen and other impurities in the sulfur conversion reactors and eliminate the need for the carefully controlled combustion step to provide the desired concentrations of feed reactants. In addition, new processes are desired which can be used to increase the throughput of existing Claus process plants and reduce the size of new Claus process plants.

SUMMARY OF THE INVENTION

In accordance with the present invention, improved processes are provided for the removal of hydrogen sulfide from feed streams by conversion to elemental sulfur. By virtue of the present invention, the concentrations of hydrogen sulfide and sulfur dioxide in the reactor feed to the sulfur reaction zone can be increased, as compared to a typical Claus process, by removing water, nitrogen and impurities, e.g. carbon dioxide, therefrom. Accordingly, the driving force and, hence, the reaction rate to form elemental sulfur can be enhanced. As a result, processes of the present invention can be used to increase the throughput of existing Claus process plants and decrease the size of new Claus process plants. In addition, it is no longer necessary to perform a carefully controlled combustion step to achieve the desired concentrations of hydrogen sulfide and sulfur dioxide in the sulfur reaction zone.

In one aspect of the invention, there is provided a process for removing hydrogen sulfide from a feed stream containing hydrogen sulfide and at least one feed impurity selected from carbon dioxide, carbon monoxide, carbonyl sulfide, carbon disulfide, hydrocarbon having from about 1 to 4 carbon atoms, nitrogen, ammonia, and hydrogen cyanide. The process includes the steps of (a) dividing the feedstream into a first split stream and a second split stream; (b) passing the first split stream to an incineration zone wherein hydrogen sulfide is converted to sulfur dioxide and water in the presence of oxygen and withdrawing an incineration product stream comprising sulfur dioxide, water and a product impurity comprising at least one of the feed impurities or a derivative thereof; (c) passing the incineration product stream to a sulfur dioxide recovery zone wherein sulfur dioxide is separated from the incineration product stream and withdrawing a sulfur dioxide product stream comprising sulfur dioxide and a waste stream comprising water and the product impurity; (d) combining the second split stream with the sulfur dioxide product stream to form a reactor inlet stream comprising hydrogen sulfide and sulfur dioxide; (e) passing the reactor inlet stream to a sulfur reaction zone wherein hydrogen sulfide and sulfur dioxide are converted to elemental sulfur and water and withdrawing a sulfur product stream comprising elemental sulfur and a tail-gas stream comprising water and said feed impurity or a derivative thereof.

In another aspect of the invention, there is provided a process for removing hydrogen sulfide from a feed stream which may or may not contain at least one of the aforementioned impurities. The process includes the steps of (a) dividing the feedstream into a first split stream and a second split stream; (b) passing the first split stream and an oxidation stream comprising oxygen and nitrogen to an incineration zone wherein hydrogen sulfide is converted to sulfur dioxide and water and withdrawing an incineration product stream comprising sulfur dioxide, water and nitrogen; (c) passing the incineration product stream to an absorption zone wherein sulfur dioxide is separated from the incineration product stream by absorption with a solvent having absorptive capacity for sulfur dioxide and withdrawing a rich solvent stream comprising sulfur dioxide and a waste stream comprising water and nitrogen; (d) passing the rich solvent stream to a regeneration zone wherein sulfur dioxide is desorbed from the rich solvent and withdrawing a sulfur dioxide product stream comprising sulfur dioxide and a lean solvent stream comprising the solvent; (e) recycling the lean solvent stream to the absorption zone; (f) combining the second split stream with the sulfur dioxide product stream to form a reactor inlet stream comprising hydrogen sulfide and sulfur dioxide; (g) passing the reactor inlet stream to a sulfur reaction zone wherein hydrogen sulfide and sulfur dioxide are converted to elemental sulfur and water and withdrawing a sulfur product stream comprising elemental sulfur and a tail-gas stream comprising water and said feed impurity or a derivative thereof.

DETAILED DESCRIPTION OF THE INVENTION

Figure 1:
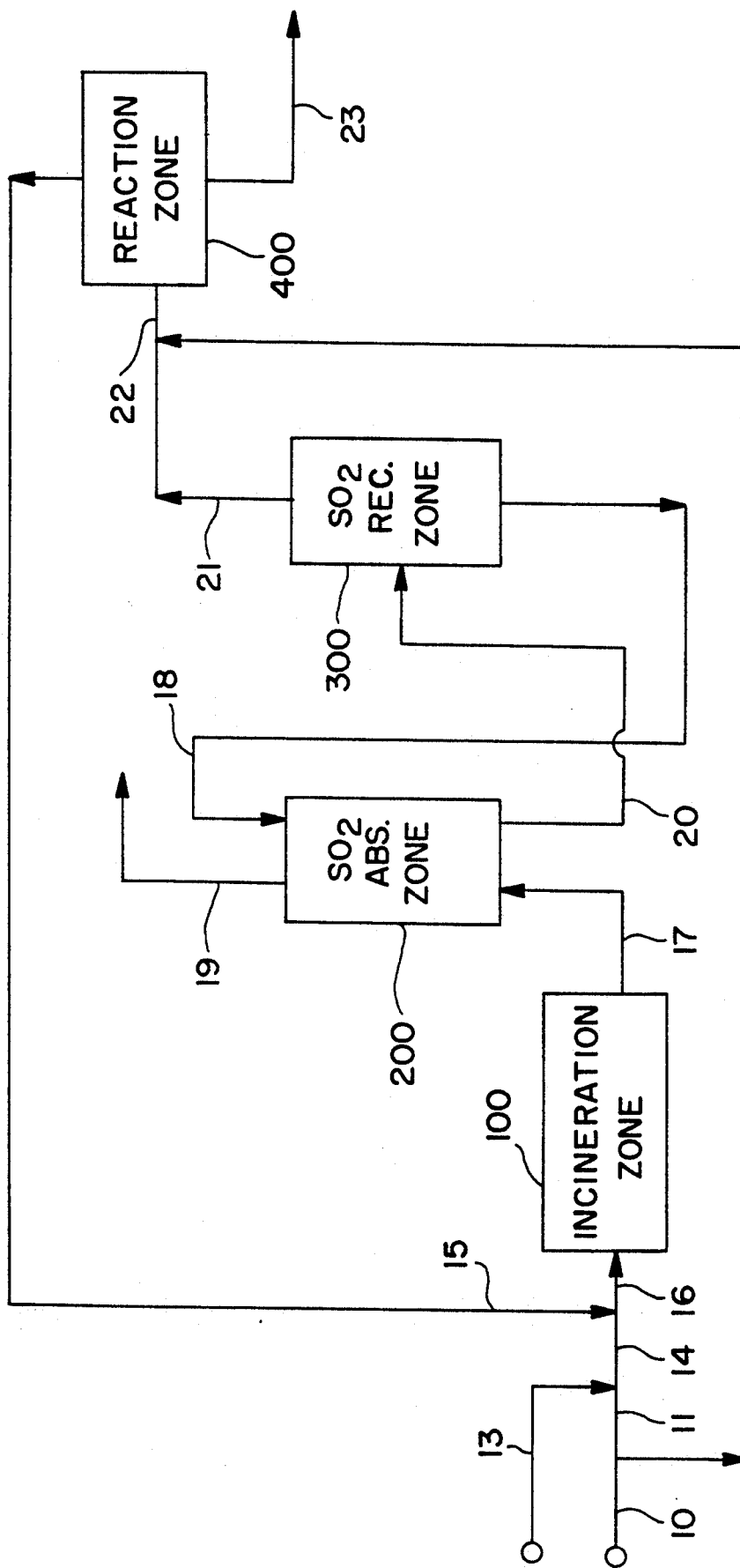
FIG. 1 illustrates a process flow diagram of a process for the removal of hydrogen sulfide in accordance with the present invention.

Feed streams suitable for processing in accordance with the present invention comprise hydrogen sulfide, generally in concentrations of from about 20 to 100 mole percent, typically from about 50 to 90 mole percent, based on the total feed stream composition. In addition, the feed streams typically comprise a feed impurity selected from the group consisting carbon dioxide, carbon monoxide, carbonyl sulfide, carbon disulfide, hydrocarbons having from about 1 to 4 carbon atoms, nitrogen, ammonia, hydrogen cyanide and mixtures thereof. The feed streams also may comprise water. The sources of such feed streams include processes from refineries, chemical plants and natural gas plants. Often, the feed streams comprise an effluent gas from hydrogen sulfide absorption processes.

In accordance with the present invention, the feed stream is divided into a first split stream and a second split stream. The first split stream is passed to an incineration zone wherein hydrogen sulfide is converted to sulfur dioxide and water in the presence of oxygen. The second split stream, as hereinafter described, is subsequently combined with sulfur dioxide formed in the incineration zone to provide a reactor inlet stream for a sulfur reaction zone wherein the hydrogen sulfide and sulfur dioxide are converted to elemental sulfur and water.

The split ratio between the first and second split streams depends on the concentration of reactants ultimately desired in the reactor inlet stream to the sulfur reaction zone. Typically, the flow rate ratio of the second split stream to the first split stream will be at least 0.5:1, preferably from about 0.5:1 to 3:1 and more preferably from about 1:1 to about 3:1. Since the stoichiometric ratio of hydrogen sulfide to sulfur dioxide in the sulfur reaction zone is two moles of hydrogen sulfide per mole of sulfur dioxide to form two moles of water and three moles of sulfur, the flow rate ratio of the second split stream to the first split stream will often be about 2:1. However, in some cases it may be desirable to adjust the ratio to below 2:1 such that there is a stoichiometric excess of sulfur dioxide in the sulfur reaction zone in order to provide a reduced concentration of hydrogen sulfide in the product from the sulfur reaction zone.

While it is possible that the oxygen required for incineration in the incineration zone may be present in the feed stream, it is more typical that oxygen will be introduced to the incineration zone. Typically, an oxidation stream comprising oxygen and nitrogen, such as air or air enriched in oxygen, is introduced to the incineration zone. In contrast to typical Claus processes, in accordance with the present invention it is not necessary or particularly advantageous to introduce pure oxygen or air enriched in oxygen to the incineration zone. This is because nitrogen present in the product stream from the incineration zone is separated from the sulfur dioxide in a sulfur dioxide recovery zone and removed from the process, as hereinafter described. Thus, preferably, the oxygen is introduced as air.

The operating conditions in the incineration zone include a temperature effective to convert hydrogen sulfide to sulfur dioxide, e.g. from about 1000° to 1400° F., in the presence of oxygen. The pressure is typically from about 0.5 to 1.5 atmospheres and preferably from about 0.9 to 1.2 atmospheres. These pressure levels are also typical of each of the other steps in the process of the present invention. Further details concerning incineration are known in the art.

During the incineration step, incineration product impurities may be formed in addition to impurities which may be present in the feed stream. For example, it is not uncommon for carbon monoxide to be converted to carbon dioxide. Thus, when a feed impurity is present in the feed stream, the product impurity from the incineration zone will comprise a feed impurity or a derivative thereof. If there are no feed impurities, but air is used for incineration, the product impurities will comprise nitrogen. In addition, during the incineration step, some elemental sulfur may be formed which can then be recovered from the process by known methods.

Typically, the incineration product stream will be cooled to recover heat such as in a waste heat boiler, which is used for stream generation. Such generated stream can be used in the process of the present invention or in other processes in the refinery, chemical plant or natural gas plant, as the case may be.

The incineration product stream from the incineration zone is passed to a sulfur dioxide recovery zone wherein sulfur dioxide is separated from the incineration product stream to provide a sulfur dioxide product stream comprising sulfur dioxide and a waste stream comprising water and product impurities which may be present in the incineration product stream. The sulfur dioxide can be recovered by any suitable means, e.g., condensation, absorption, adsorption or the use of ion-exchange resins. For instance, if the concentration of product impurities is low, water can be simply condensed from the incineration product stream by cooling. However, more typically, it will be desirable to use a physical or chemical solvent having absorptive capacity for sulfur dioxide to separate the sulfur dioxide from water and product impurities, e.g., nitrogen and carbon dioxide, in the incineration product stream. Suitable solvents may include, for example, sulfites, such as sodium sulfite; caustics, such as caustic soda; alkanolamines, such as monoethanolamine and triethanolamine; aromatic amines, such as dimethylaniline; diamines, such as piperazine and derivatives thereof; sterically hindered amines; or mixtures thereof. Preferred amines are those which comprise a water soluble half-salt of a diamine having a molecular weight of less than about 300 grams/gram mole in free-based form and a pKa value of about 4.5 to 7.3 for the free nitrogen atom in half-salt form. Examples of such preferred amines include N,N',N'-(trimethyl)-N-(2-hydroxyethyl)-ethylenediamine,
N,N,N',N'-tetramethyl-ethylenediamine,
N,N,N',N'-tetramethyl-diaminomethane,
N,N,N',N'-tetrakis-(2-hydroxyethyl)-ethylenediamine,
N,N'-dimethylpiperazine,
N,N,N',N'-tetrakis-(2-hydroxyethyl)-1,3-diaminopropane, N',N'-dimethyl-N,
N-bis(2-hydroxyethyl)-ethylenediamine,
N-(2-hydroxyethyl)-piperazine, N,N'-bis(2-hydroxyethyl)-piperazine, N-methyl-piperazine, and piperazine. Mixtures of such amines are also preferred. Especially preferred amines include N,N',N'-(trimethyl)-N-(2-hydroxyethyl)-ethylenediamine, N-(2-hydroxyethyl)-piperazine, and N,N'-bis(2-hydroxyethyl)-piperazine. Such amines are further described in detail in U.S. Pat. No. 5,019,361, issued May 28, 1991, hereby incorporated by reference herein.

Preferably, the sulfur dioxide recovery zone comprises an absorption zone wherein sulfur dioxide is separated from the incineration product stream by absorption with a solvent such as described above to provide a rich solvent stream comprising sulfur dioxide and the solvent and a waste stream comprising water and product impurities. Preferably at least 80%, more preferably at least 90%, of the product impurities in the incineration product stream are withdrawn in the waste stream. Typically, the concentration of sulfur dioxide in the waste stream will be less than 500 ppm and often less than 100 ppm. Operating conditions in the absorption zone, such as temperature, pressure, solvent-to-feed ratios, and the like, are dependent upon the particular solvent employed and are generally known to those skilled in the art. The sulfur dioxide recovery zone preferably also comprises a regeneration zone wherein sulfur dioxide is desorbed from the rich solvent stream to provide a sulfur dioxide product stream comprising sulfur dioxide and a lean solvent stream comprising the solvent. The operating conditions in the regeneration zone, such as temperature, pressure, steam rates, and the like, are dependent upon the particular solvent employed and are generally known to those skilled in the art.

Preferably, the sulfur dioxide product stream obtained from the sulfur dioxide recovery zone comprises greater than 95 mole percent sulfur dioxide and more preferably greater than 98 mole percent sulfur dioxide. The balance of the sulfur dioxide product stream will typically comprise water and product impurities such as, for example, nitrogen and carbon dioxide.

The sulfur dioxide product stream is combined with the second split stream hereinbefore described to provide the desired ratio of hydrogen sulfide to sulfur dioxide in the reactor inlet stream to the sulfur reaction zone. Preferably, substantially the only impurities present in the reactor inlet stream will be those feed impurities contained in the second split stream. As a result, the concentration of hydrogen sulfide and sulfur dioxide in the present invention will typically be higher than the concentration of such components in the reactor feed of a typical Claus process. Accordingly, it is feasible in accordance with the present invention to achieve increased reaction rates in the sulfur reaction zone without compressing the reactor inlet stream to increase the partial pressure of hydrogen sulfide and sulfur dioxide. Preferably, the sum of the concentrations of hydrogen sulfide and sulfur dioxide in the reactor inlet stream is greater than 40 mole percent, more preferably, greater than 65 mole percent and most preferably, greater than 75 mole percent, e.g., from about 75 to 95 mole percent or higher.

In the sulfur reaction zone, hydrogen sulfide and sulfur dioxide are converted to elemental sulfur and water. Typically, the sulfur reaction zone will comprise one or more catalytic zones, e.g. Claus reactors, which contain a catalyst, such as a cobalt-molybdenum catalyst on an alumina support. Operating temperatures in the sulfur reaction zone are generally in the range of about 200° to 700° F. Further details concerning alternate catalysts and specific operating conditions, including temperature, space velocity and the like, are known to those skilled in the art. Preferably, the overall reaction efficiency of the process in converting hydrogen sulfide and sulfur dioxide to elemental sulfur is greater than 95 weight percent and more preferably, greater than 98 weight percent. Since, in accordance with the present invention, unconverted hydrogen sulfide and sulfur dioxide can be recycled, as further described below, it is not necessary to operate the sulfur reaction zone at maximum efficiency. Thus, it may be desirable, for example, to reduce the number of catalytic stages, e.g., from 3 to 2, and operate at a lower reaction efficiency on a per-pass basis, e.g., 75 weight percent. As a result, the overall economics of the process, for example, may be improved. Reaction efficiencies can be readily determined by dividing the weight of elemental sulfur produced in a given time period by the weight of sulfur introduced, either to the reaction zone (for perpass efficiencies) or in the feed stream (for overall efficiencies), as hydrogen sulfide and sulfur dioxide in the same time period.

The sulfur dioxide reaction zone provides a sulfur product stream comprising elemental sulfur and a tail-gas stream comprising water and feed impurities which may have been present in the second split stream, or derivatives thereof. The tail-gas stream may also comprise low concentrations, e.g., less than about 2 weight percent, of product impurities. If the concentrations of hydrogen sulfide and sulfur dioxide are below environmental limits, the tail-gas stream can be directly vented to the atmosphere. Alternatively, the tail-gas stream, or a portion thereof, can be recycled to the incineration zone for further processing in accordance with the present invention. Recycling the tail-gas stream to the incineration zone is preferred when the concentration of hydrogen sulfide in the tail-gas stream exceeds the environmental limit. Another option is to recycle the tail-gas stream, or a portion thereof, to the sulfur dioxide recovery zone for processing in accordance with the present invention. Recycling the tail-gas stream to the sulfur dioxide recovery zone is preferred when the concentration of hydrogen sulfide is below the environmental limitation, but the concentration of sulfur dioxide exceeds the environmental limitation.

Since in accordance with the present invention, the sulfur dioxide recovery zone is integrated in the process upstream of the sulfur reaction zone, both the rejection of impurities and clean-up of the tail-gas stream are provided in the sulfur dioxide recovery zone. Thus, it is no longer necessary to provide a separate clean-up system on the tail-gas stream from the sulfur reaction zone, such as commonly included in typical Claus processes.

FIG. 1 illustrates a process flow diagram in accordance with the present invention. The process flow diagram is provided for illustrative purposes and is not intended to limit the scope of the claims which follow. Those skilled in the art will recognize that the process flow diagram does not illustrate various common pieces of process equipment such as, for example, heat exchangers, pumps, compressors, fractionation columns, heaters, process control systems and the like.

A tail-gas stream from a hydrogen sulfide absorption unit in a natural gas plant containing about 90 mole percent hydrogen sulfide and 10 mole percent carbon dioxide is introduced to the process by a line 10. The entire process operates at a pressure of about 0.5 to 1.5 atmospheres. Stream 10 is divided to form a first split stream 11 containing approximately ⅓ of the volume of stream 10 and a second split stream 12 containing approximately ⅔ of the volume of stream 10. An air stream is introduced to the process by a line 13 and combined with line 11 to form line 14. A recycle stream 15 comprising hydrogen sulfide, sulfur dioxide and water, the source of which is hereinafter defined, is combined with line 14 to form an incineration zone feed stream which is passed by a line 16 to incineration zone 100. The incineration zone operates at a temperature of about 1100° F. A stoichiometric amount of oxygen sufficient to convert all of the hydrogen sulfide in line 16 to sulfur dioxide is supplied to the incineration zone by the air in line 13.

An incineration zone product stream comprising sulfur dioxide, nitrogen, water and carbon dioxide is withdrawn from incineration zone 100 by a line 17 and passed to a sulfur dioxide absorption zone 200 wherein sulfur dioxide is recovered from the incineration zone product stream by contacting within an absorption solvent which is introduced to absorption zone 200 by a line 18, the source of which is hereinafter described. Absorption zone 200 operates at a temperature of about 100° to 200° F.

A waste stream comprising carbon dioxide, water and nitrogen is withdrawn from absorption zone 200 by a line 19. A rich solvent stream comprising sulfur dioxide is withdrawn from the absorption zone 200 by a line 20 and passed to a solvent regeneration zone 300 wherein sulfur dioxide is desorbed from the rich solvent. Solvent regeneration zone 300 operates at a temperature of about 150° to 300° F. A lean solvent stream comprising the absorption solvent and having a reduced quantity of sulfur dioxide relative to rich solvent stream 20 is withdrawn from solvent regeneration zone 300 by line 18 and introduced to the absorption zone 200 as hereinbefore described.

The sulfur dioxide product stream is withdrawn from regeneration zone 300 by a line 21 and combined with the second split stream i.e., line 12, to form a reactor inlet stream which is passed to a sulfur reaction zone 400 by a line 22. The reactor inlet stream comprises approximately 62% hydrogen sulfide, 31% sulfur dioxide and 7% carbon dioxide. Sulfur reaction zone 400 comprises two catalytic zones containing an alumina supported cobalt-molybdenum catalyst. The temperature in the first catalytic zone within sulfur reaction zone 400 operates at a temperature from about 550° F. to 600° F. The temperature in the second catalytic zone operates at a temperature of about 300° to 350° F. The space velocity through each catalytic stage is in the range of about 500 to 1000 $Nm^3$ gas/hr $m^3$ of catalyst. In the sulfur reaction zone elemental sulfur is formed by the reaction of hydrogen sulfide and sulfur dioxide to form elemental sulfur and water.

A sulfur product stream comprising elemental sulfur is withdrawn from reaction zone 400 by a line 23 and removed from the process. A tail-gas stream comprising carbon dioxide, water and unreacted hydrogen sulfide and sulfur dioxide is withdrawn from reaction zone 400 and recycled to incineration zone 100 by line 15 as hereinbefore described.

Those skilled in the art will recognize that although the invention has been described with respect to specific aspects, other variations are included within the scope of the claims which follow. For example, instead of recycling the tail-gas stream to the incineration zone, it may be preferred to recycle the tail-gas stream directly to the sulfur recovery zone if the concentration of hydrogen sulfide is low, or, to utilize a separate sulfur recovery zone, if, for example, the tail-gas stream is not in close proximity to the sulfur dioxide recovery zone. In such a case, both the sulfur dioxide recovery zone and the additional absorption zone may, for example, share the same solvent circulation loop. Also, instead of recycling the tail-gas stream to the incineration zone, it may be preferred to pass the tail-gas stream to a separate incineration zone to form a converted tail-gas stream and recycle the converted tail-gas stream to the sulfur dioxide recovery zone. Furthermore, although the invention has been described with reference to particular process streams, the scope of the claims also includes portions of such streams.

I claim:

1. A process for removing hydrogen sulfide from a feed stream comprising:

(a) dividing the feed stream into a first split stream and a second split stream;

(b) passing the first split stream and an oxidation stream comprising oxygen and nitrogen to an incineration zone wherein hydrogen sulfide is converted to sulfur dioxide and water in the presence of oxygen at a temperature of about 1000° to 1400° F. and withdrawing an incineration product stream comprising sulfur dioxide, water and nitrogen;

(c) passing the incineration product stream to an absorption zone wherein sulfur dioxide is separated from the incineration product stream by absorption with a solvent comprising a water soluble half-salt of a diamine having a molecular weight of less than about 300 grams/gram mole in free-based form and a pKa value of about 4.5 to 7.3 for the free nitrogen atom in half-salt form and withdrawing a rich solvent stream comprising sulfur dioxide and a waste stream comprising water and at least about 80% of the nitrogen from the incineration product stream;

(d) passing the rich solvent stream to a regeneration zone wherein sulfur dioxide is desorbed from the rich solvent and withdrawing a sulfur dioxide product stream comprising sulfur dioxide and a lean solvent stream comprising the solvent;

(e) recycling the lean solvent stream to the absorption zone;

(f) combining the second split stream with the sulfur dioxide product stream to form a reactor inlet stream comprising hydrogen sulfide and sulfur dioxide;

(g) passing the reactor inlet stream to a sulfur reaction zone comprising more than one catalytic zone wherein hydrogen sulfide and sulfur dioxide are converted to elemental sulfur and water and withdrawing a sulfur product stream comprising elemental sulfur and a tail-gas stream comprising water and said feed impurity or a derivative thereof; and (h) recycling at least a portion of the tail-gas stream to the incineration zone or the sulfur dioxide recovery zone.

2. The process of claim 1 further comprising introducing an oxidation stream comprising oxygen and nitrogen to the incineration zone.

3. The process of claim 2 wherein the product impurity comprises nitrogen.

4. The process of claim 1 wherein the flow rate ratio of the second split stream to the first split stream is from about 1:1 to about 3:1.

5. The process of claim 1 wherein the flow rate ratio of the second split stream to the first split stream is effective to provide stoichiometric excess of sulfur dioxide in the reactor inlet stream.

6. The process of claim 1 wherein the sum of the concentrations of hydrogen sulfide and sulfur dioxide in the reactor inlet stream is greater than about 40 mole percent.

7. The process of claim 6 wherein the sum of the concentrations of hydrogen sulfide and sulfur dioxide in the reactor inlet stream is greater than about 75 mole percent.

8. The process of claim 1 wherein the tail-gas stream further comprises unreacted hydrogen sulfide and sulfur dioxide.

9. The process of claim 8 further comprising converting the hydrogen sulfide present in the tail-gas stream to sulfur dioxide to form a converted tail-gas stream and recycling the converted tail-gas stream to the sulfur dioxide recovery zone.

10. The process of claim 1 wherein the absorbent is selected from the group consisting of N,N',N'-(trimethyl)-N-(2-hydroxyethyl)-ethylenediamine, N-(2-hydroxyethyl)-piperazine, and N,N'-bis(2-hydroxyethyl)-piperazine.

* * * * *